United States Patent [19]

Cowe et al.

[11] 4,040,024
[45] Aug. 2, 1977

[54] EDITING SYSTEM FOR A RANDOM ACCESS MEMORY

[75] Inventors: Alan Barnett Cowe; John Francis de Raismes, both of Denville, N.J.

[73] Assignee: Teleram Communications Corporation, Mamaroneck, N.Y.

[21] Appl. No.: 617,001

[22] Filed: Sept. 26, 1975

[51] Int. Cl.² ............................ G06F 7/06; G11C 9/04
[52] U.S. Cl. ..................................................... 364/900
[58] Field of Search ...................................... 340/172.5

[56] References Cited
U.S. PATENT DOCUMENTS

| | | | |
|---|---|---|---|
| 3,241,120 | 3/1966 | Amdahl | 340/172.5 |
| 3,685,019 | 8/1972 | Conroy et al. | 340/172.5 |
| 3,838,396 | 3/1976 | Martin | 340/172.5 |
| 3,980,994 | 9/1976 | Ying et al. | 340/172.5 |

Primary Examiner—Gareth D. Shaw
Assistant Examiner—C. T. Bartz

Attorney, Agent, or Firm—Eugene Lieberstein

[57] ABSTRACT

An editing system for processing the contents of a random access memory, used in conjunction with a visual display and an alphanumeric control keyboard. The editing system comprises two basic sequential circuits which permit either the deletion of a character or insertion of a character within the memory. A void created by the deletion of a character will be removed simply by reorganizing the memory following the deletion. Conversely, characters may be inserted within the contents of the memory at any desired memory location without destroying the contents of memory at such location by reorganizing the data following the point of insertion. Further use of the insert and delete sequence logic is employed in a manner which automatically permits more complex operations to occur, as required by the operator, such as removal of multiples of characters or words or to further reorganize the memory contents.

9 Claims, 15 Drawing Figures

EDITING SYSTEM FOR A RANDOM ACCESS MEMORY

This invention relates to an editing system for processing the contents of a random access memory used in conjunction with a visual display and control keyboard.

One of the problems encountered in the use of a random access memory with a visual display and alphanumeric control keyboard is eliminating unwanted data within the memory or editing existing data. Although complex systems exist today capable of performing such editing operations they are not readily adapted to light weight portable terminal equipment which require editing capability in a simple and reliable manner without complex instructions and manipulations of the keyboard.

Accordingly, it is the principal object of this invention to provide a light weight, inexpensive electronic editing system to facilitate the correcting and modifying of data by entering, inserting, and deleting data within a random access memory.

Another object of this invention is to provide an editing system for a random access memory which will delete data representing a simple character or a word formed by a string of characters merely by placing a cursor on the character or word and depressing an appropriate single control key.

Another object of this invention is to provide an editing system for a random access memory which will automatically, upon depression of an appropriate control key, remove all voids in memory causing the data in the memory to be contiguous.

Another object of this invention is to provide an editing system for a random access memory which will automatically, upon depression of an appropriate control key, cause multiple character voids to occur in the data stream at any desired address in memory without destroying any of the data presently in memory.

Further objects and advantages of this invention will be apparent from the following detailed description when read in connection with the accompanying drawings of which:

Figure 1:
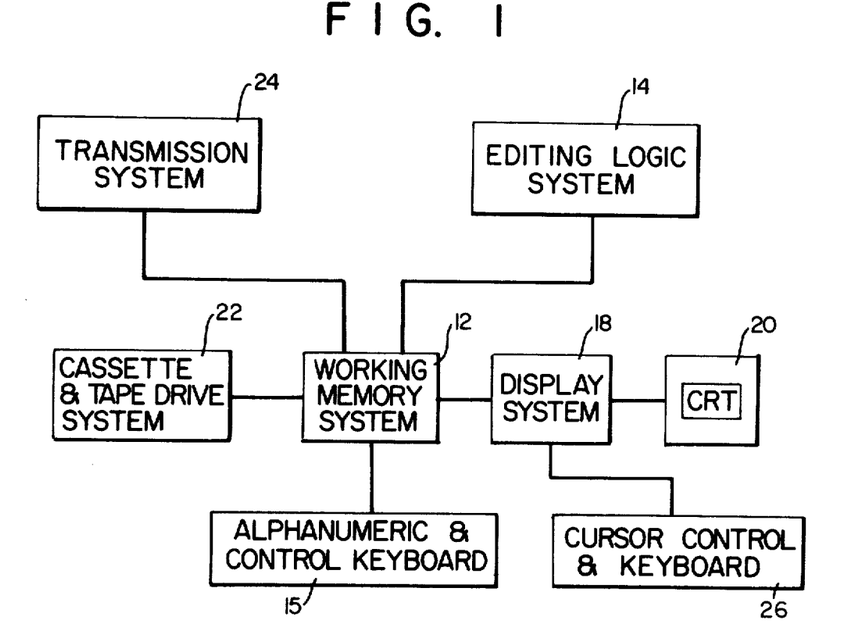
FIG. 1 is a system block diagram of the random access memory terminal including the editing logic section of the present invention.
Figure 2:
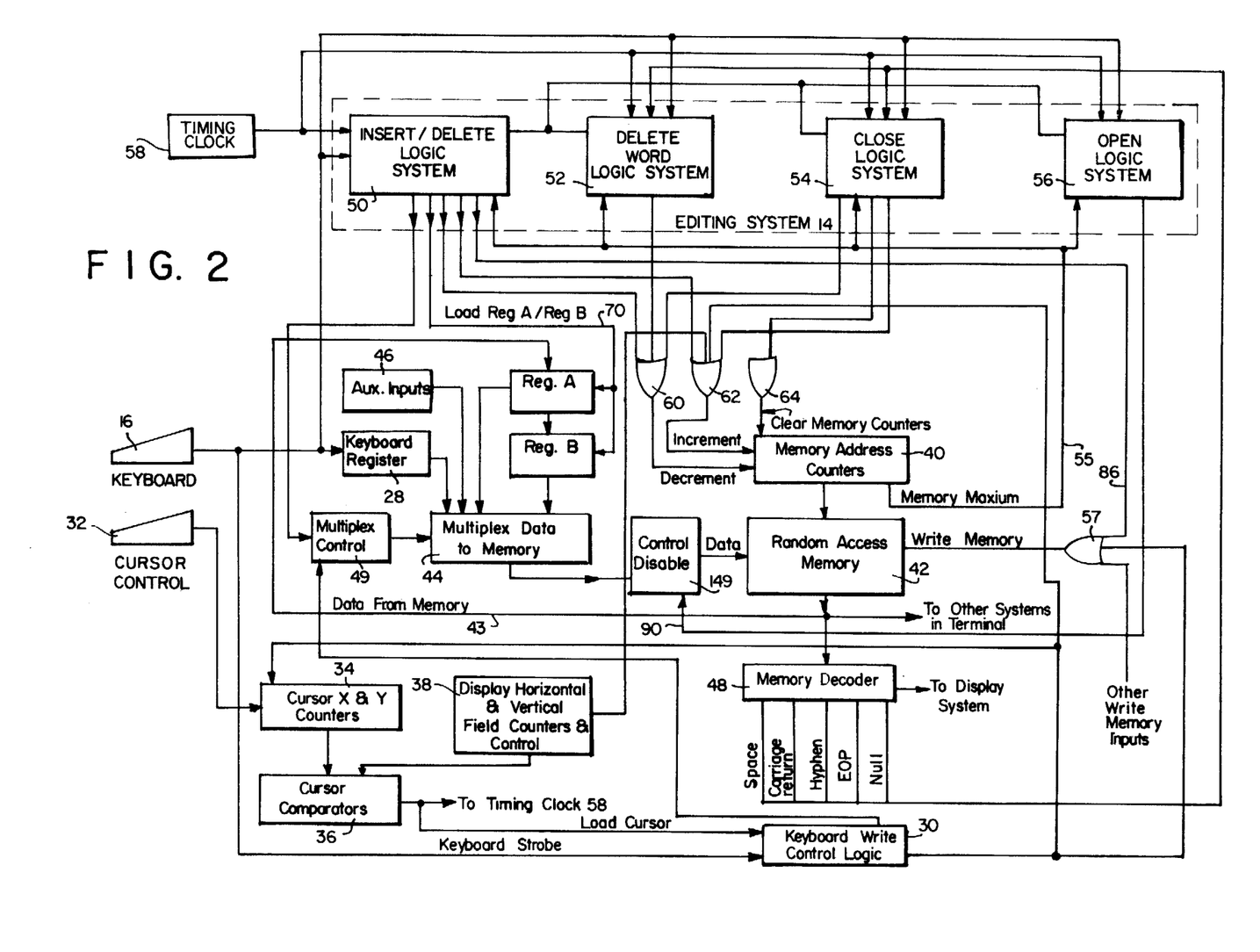
FIG. 2 is a more detailed block diagram of the random access memory system and editing logic of the present invention.

A general block diagram of the random access memory and editing terminal of the present invention is disclosed in FIG. 1 comprising: a random access working memory system 12, which will be elaborated upon more fully in connection with the more detailed block diagram of FIG. 2, an editing section 14, an alphanumeric and control keyboard 15 for data entry into the memory system 12, a display system 18 with a display cathode ray tube (CRT) 20, and other peripheral equipment such as a magnetic tape cassette 22 for recording data generated within the working memory system 12 and a transmission system 24 which permits transmission of data from the memory system 12 to, for example, a printer or a control computer as well as to permit data to be received by the memory system 12. The cursor control 26 determines the input address to the working memory system 12.

Figure 2A:
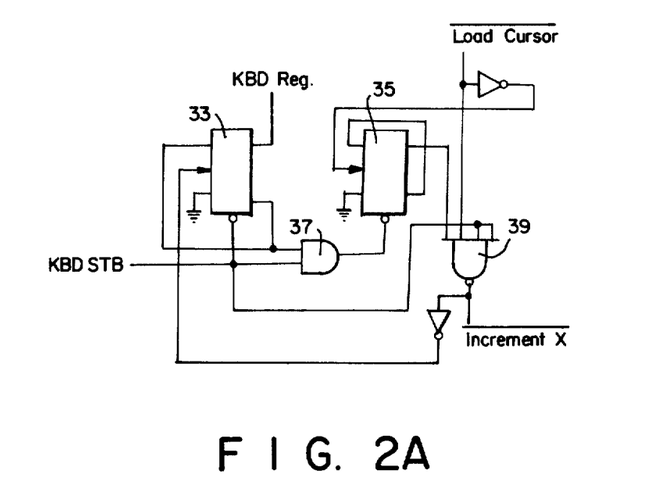
FIGS. 2a and 2b schematically illustrate the circuits representing the keyboard write logic and memory decoder of FIG. 2.

The alphanumeric and control keyboard 15 includes a conventional mechanically operated keyboard 16 with alphanumeric and control keys, a keyboard register 28 and keyboard write command logic 30 as shown in FIGS. 2 and 2a. The alphanumeric keys on the keyboard 16 generate ASCII encoded data, 7 bits wide, and permits one of 128 codes to be entered into the working memory system. The control keys are provided to initiate the editing functions to be performed by the editing system of the present invention.

The display system 18 controls the printing of alphanumeric characters on the CRT 20 in a conventional manner not forming a part of the present invention. Briefly, the data to be displayed on a particular row on the CRT 20 is read from the working memory system 12 into a display row buffer which is then recirculated during each scan line within the display row buffer. Data at the output of the display row buffer is presented to a character generation read only memory which acts to interpret the data codes received from the display row buffer, along with the particular count from a scan line counter and will generate a dot pattern as is well known. This pattern is then loaded into a video register and serially fed to the CRT 20 via video gating circuitry. The successive generation of such patterns on each scan line within a given row will form a number of characters on such row thereby producing an alphanumeric display of characters.

The data in the working memory 12 is packed such that the text may be considered as a continuous serial stream of data, to be formatted for display such that words generally will not break at the end of each line. Voids left at the end of each line on the display system do not occupy character positions in memory. The line ending conditions or codes (i.e., end of word near the end of a line, carriage return (CR) or end of paragraph (EOP)) will inhibit read out from the working memory to the row buffer in the display system 18 such that the next character in memory will appear at the first position on the next line.

The operator of the system may determine the point of entry of a character from the cursor control keyboard 32 by means of a display cursor which appears as a predetermined symbol on the display. Generation of the display cursor per se is conventional and does not form a part of the present invention. However, because the cursor is employed in performing certain editing functions it is necessary to briefly explain the manner in which the cursor determines the input address to the working memory. This is achieved by use of the cursor x and y address counters 34, cursor comparators 36 and the display horizontal and vertical field counters and control 38. The cursor comparators 36 compares the address of the cursor x and y counters 34 with the display horizontal and vertical field counters 38 and provides an output load cursor signal when these counters are numerically equal. The load cursor signal output from the cursor comparators 36 indicates that the memory address counters 40 are at the desired address as visually indicated by the cursor on the display CRT 20.

Figures 2B, 3:
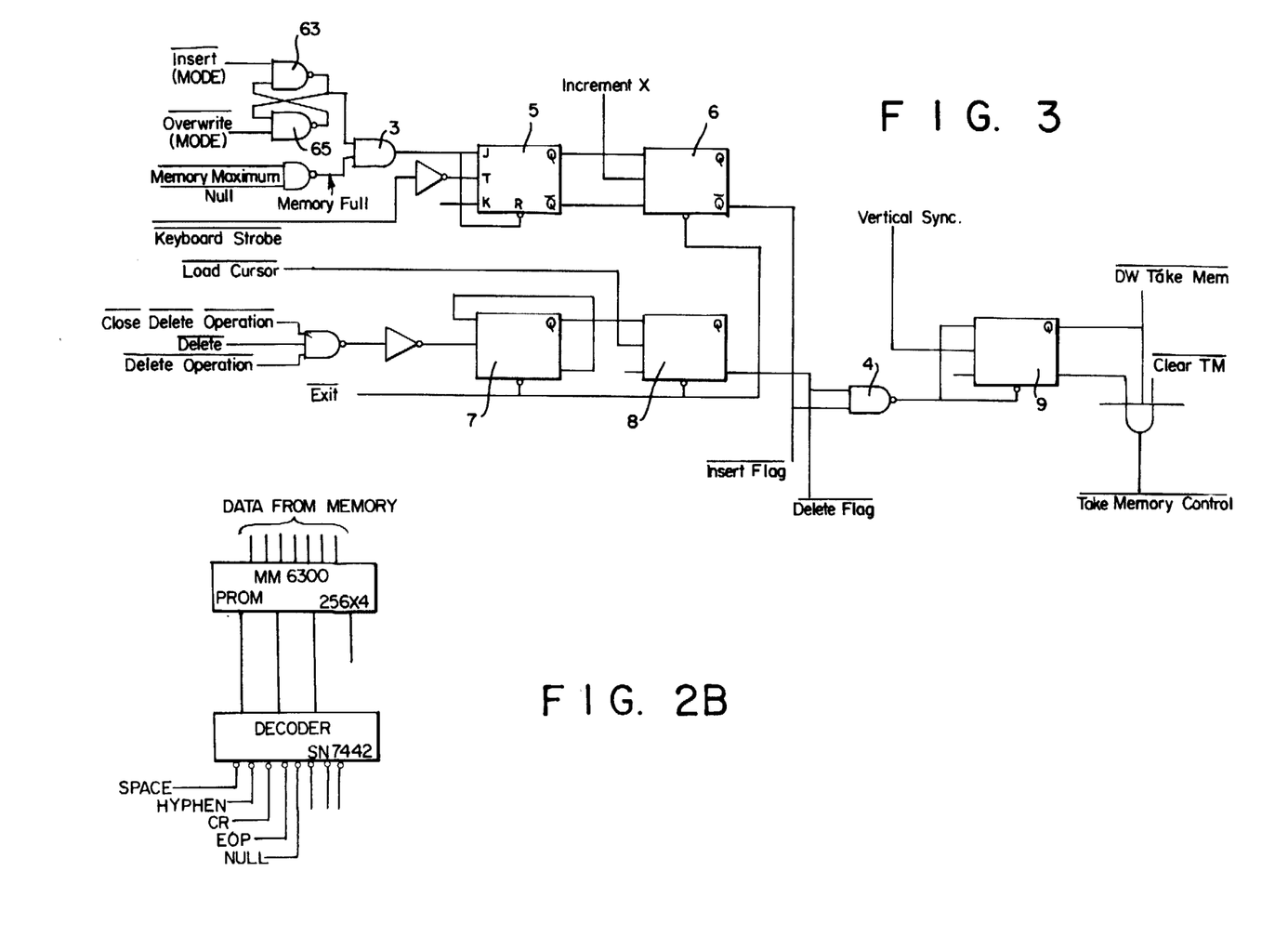
FIGS. 3 and 4 illustrate schematically the insert, and delete sections of the editing logic of the present invention.

The working memory system 12 comprises a 2,048 by 7 bit random access memory 42, memory address counters 40 and a data input multiplexer 44. The data input multiplexer 44 permits data to be entered into the random access memory 42 from either the keyboard 16, the transmission system 24, the cassette system 22 or from register A or register B as will be further elaborated upon hereafter. The transmission and cassette system are indicated in FIG. 2 as representing auxiliary inputs 46. The data input multiplexer 44 is a conventional unit consisting of four dual 4 to 1 digital multiplexers. Also representing part of the working memory system 12 is a memory decoder 48 which as shown in FIG. 2b consists of a read only memory (mm6300) and a decoder (SN75442). The decoder responds to one of the following line ending character codes: space, carriage return (CR), hyphen, end of paragraph (EOP) and null.

The output of the random access memory 42 will transfer data to the display system 18, transmission and cassette systems 24 and 22 respectively and to register A for performing editing functions in connection with the editing logic 14 as will be explained in greater detail hereinafter. The random access memory 42 is normally dedicated to the display system 18. As the display system 18 transfers a row of characters from the memory system 12 into the row buffer (not shown) of the display system 18, the memory address counters 40 are incremented by the number of characters to be shown on that row of the display CRT 20. After one line of data has been transferred from the memory to the display row buffer (not shown) the memory address counters 40 will then provide the starting address for the first character on the next row of the display CRT 20. This process will continue until the last row of characters have been transferred to the display system 18. After that point a vertical sync signal derived from the display horizontal and vertical field counters 38 will then preset the memory address counters to the original starting address. As data is being transferred from the random access memory 42 to the display system 18, the occurrence of the "space", "hyphen", "carriage return (CR)", or "end of paragraph (EOP)" code will be decoded by the memory decoder 48 and used by the display system 18 and line ending logic (not shown) to terminate the transfer of further data from memory 42 for that row. The memory address counters are under the control of the display system 18 when such system 18 has control of the random access memory 42.

Data going into the random access memory 42 is directed through the data multiplexer 44 under the control of the multiplex control 49. The editing system 14 of the present invention operates upon the random access memory system 42 in conjunction with register A and register B respectively. Both registers A and B are commercially available SN7495 registers and are each capable of storing a single character. Register A receives information from the random access memory 42 on line 43 while register B receives its information directly from register A.

The editing system comprises an insert and delete logic system 50, a delete word logic system 52, a close logic system 54 and an open logic system 56. Clock 58 provides the timing for the entire terminal system. Or gates 60, 62 and 64 permit the memory address counters 40 to be incremented and decremented by the appropriate logic system. Data is fed back to the editing system 14 from the random access memory 42 through the memory decoder 48. Characters are sequentially admitted into memory 42 from the keyboard 16 whether the system is in the insert editing mode, with memory dedicated to the insert logic system as will be explained hereafter in connection with FIGS. 3 and 4, or an overwrite or other mode of operation. In the latter case characters are entered without any reorganization of memory 42. Upon entering an alphanumeric character into the random access memory 48 from the keyboard 16, the following occurs: (1) the keyboard write control logic 30 detects the presence of a character coming from the keyboard 16, (2) the character is loaded into the keyboard register 28 which is a conventional SN7495 register, (3) the keyboard write control logic 30 waits for a load cursor signal derived from the cursor comparators to indicate that the memory address counters are at the proper address as indicated by the cursor symbol on the display CRT 20, (4) the character from the keyboard is presented to the random access memory 42 from the keyboard register 28 via the multiplexer 44 upon command from the multiplex control 49 and (5) the random access memory 42 is given a write command from the keyboard write control 30 through Or gate 57 which causes the character presented to the memory to be written therein thus storing the character in memory 42. The keyboard write control is more elaborately shown in FIG. 2A. When any alphanumeric key is depressed on the keyboard 16 the keyboard strobe signal becomes true. This causes flip-flop 33 which is normally set to reset. Since the keyboard strobe signal is true for only a short duration, when it reverts to its nonactive state flip-flop 35 is enabled through AND gate 37. When the load cursor output makes a high to low transition flip-flop 35 sets enabling gate 39. The next load cursor signal causes the keyboard character to be written into the memory, the cursor x and y counters 34 to be incremented, and the memory address counters 40 to be incremented.

Figure 4:
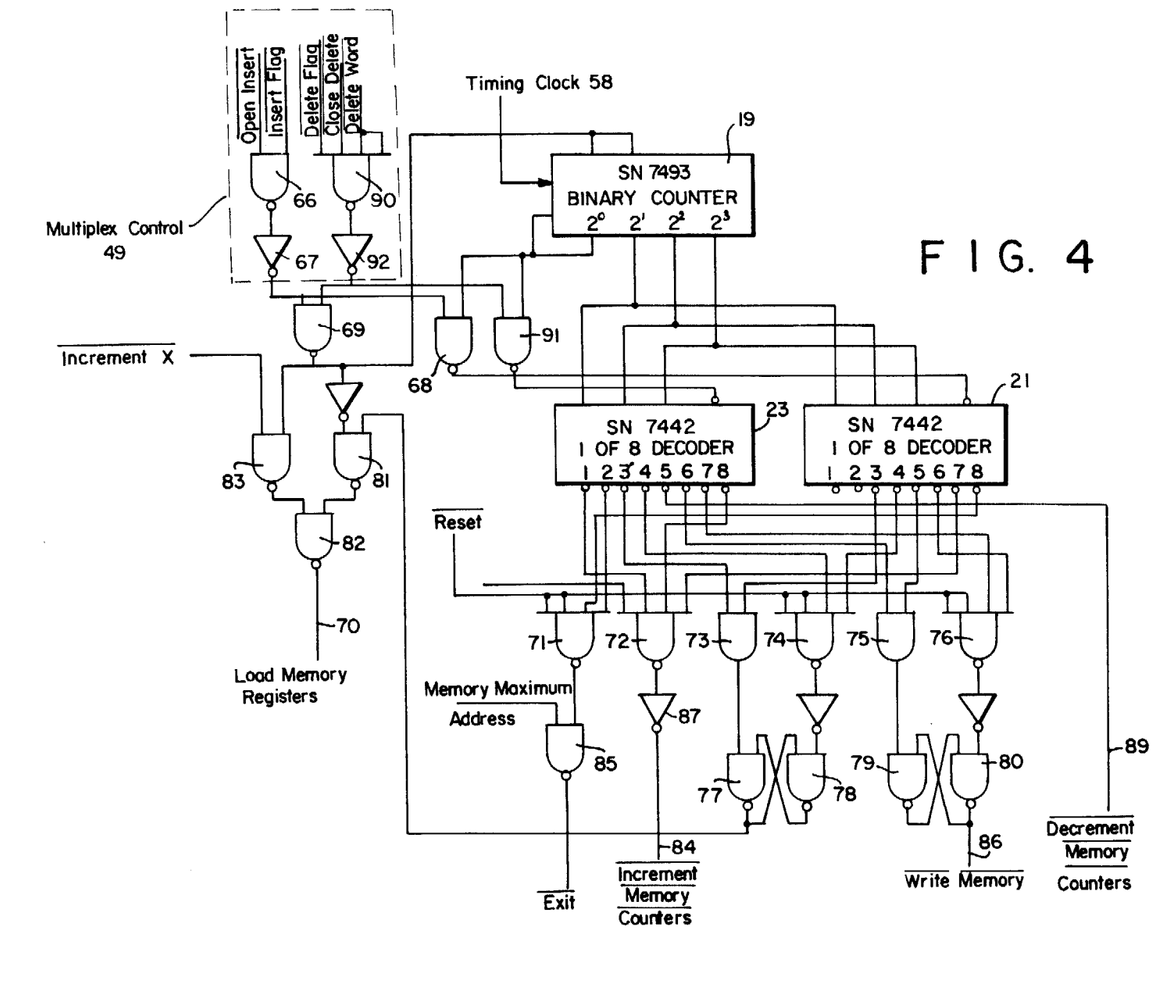
Figure 5:
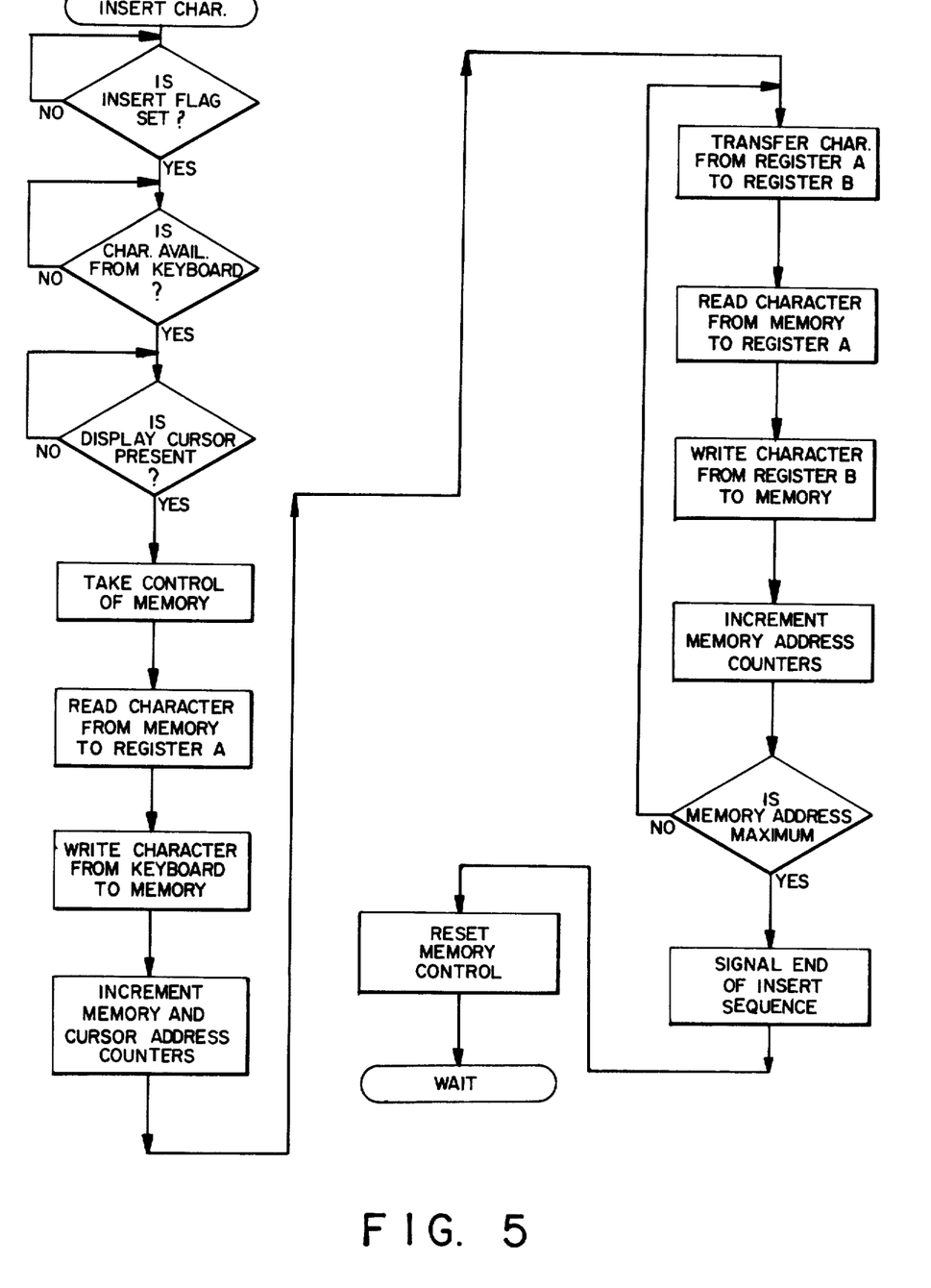
FIG. 5 is a flow diagram of the insert character sequence.

A logic schematic of the inert delete logic system 50 of FIG. 1 is shown in FIGS. 3 and 4. The insert character logic sequence is illustrated in FIG. 5. The insert logic, when activated, will cause data received from the keyboard 16 to be inserted between the text in the memory 42 and cause all remaining data in the memory to be shifted to the next higher address. NAND gate 63 controls the insert mode whereas NAND gate 65 controls the overwrite mode. The overwrite mode does not relate to the editing system and is accordingly not discussed herein. To insert a character at an appropriate location in memory requires that the display cursor be positioned on the display CRT 20 at the desired location in which a character or series of characters are to be inserted. The insert mode is then accordingly established by depressing an insert key on the keyboard 16. This enables flip-flop 5 which thereafter detects characters coming from the keyboard 16 in synchronism with the keyboard strobe signal unless and/or until the random access memory 42 is full in which case AND gate 3 disables the insert mode. All of the flip-flops shown are conventional JK flip-flops. Flip-flops 6 and 9 time the insert sequence of a character into memory. The insert flag signal is generated by flip-flop 6 which becomes true, if flip-flop 5 is set, upon the occurrence of the increment x signal. Increment x is derived from the keyboard write control 30 and is generated every time a character key is depressed on the keyboard 16. Flip-flop 9 becomes true, once the insert flag is set, upon the next occurrence of a vertical sync signal. The vertical sync signal is being generated continuously from the display horizontal and vertical field counters 38 and it is used to properly time the take memory control signal so as to assure synchronization with the display system 18. Upon setting flip-flop 9 the take memory control signal is generated dedicating memory to the editing system 14.

Binary counter 19 and decoder 21 are enabled with the insert flag set through NAND gate 66, inverter 67 and NAND gates 68 and 69 respectively. By depressing a character key on the keyboard 16 the character is loaded into the keyboard register 28 and remains there until it is transferred to the memory 42 under a write command from the keyboard write logic 30. The presence of an increment x signal with the insert flag signal set results in a load memory register signal on line 70 to cause register A to be loaded with the character contents from the random access memory 42 at the memory address corresponding to the display cursor position on the display CRT 20. Likewise, the character in the keyboard register is entered into memory as heretofore described for entering a character from the keyboard into memory. The keyboard write control logic 30 following the entry of a character into memory 42 will cause the memory address counter 40 through Or gate 62 to be incremented to the next address and will also increment the cursor x and y counters. Up to this point, the insert sequence logic 50 has caused register A to be loaded with the contents of memory at the memory address corresponding to display cursor address on the CRT 20 and has written into memory at such address the contents of the keyboard register 28. Thereafter a continuous sub-routine begins and continues until the memory address counters 40 reach memory address maximum at which point AND gate 3 disables flip-flop 5 and an exit signal is generated. The exit signal resets flip-flop 6, clears the binary counter 19 and disables decoder 21. The sub-routine involves a repetitive insert sequence for reorganizing memory following the insertion of the new character in memory. The logic sequence as indicated in the flow diagram of FIG. 5 is as follows: transfer the character in register A to register B, read the character from the incremented address location in memory and load it into register A, write character contents of register B through the data multiplexer 44 into memory, increment the memory address counter and repeat the sequence. This process continues thus removing each character from a particular address in the memory, storing it in register A, writing the previous character stored in register B into that address in memory, then incrementing memory and repeating the cycle until the memory maximum condition is reached. The memory maximum condition will reset the insert sequence logic 50 and release control of the memory 42.

The sub-routine sequence is accomplished using the binary counter 19 and decoder 21 of the insert logic system 50 in conjunction with registers A and B. Binary counter 19 counts 16 states, eight of which are decoded by decoder 21. Six of these eight states are used to generate the insert sub-routine sequence with state three of decoder 21 going through gates 73, 77, 81 and 82 and with state (4) going through gates 74 and 78. State (3) and state (4) provide the function of loading register B with the contents of register A and loading register A with the content of the random access memory at the incremented memory address. States (5) and (6) form the write memory signal on line 86 through gates 75, 76, 79 amd 80, to transfer the contents of register B to memory at the incremented memory address. State (7) is used to increment the memory address counter 40 through gate 72 on line 84. State (8) is used to test for a memory address maximum condition through gates 71 and 85. If memory address is not at maximum, the insert sequence is recycled and the binary counter 19 recounts. If the memory address is at maximum gate 95 provides an exit signal which resets flip-flop 6 disabling the insert flag which in turn resets flip-flop 9 to clear the binary counter 19 and to disable the decoder 21.

Although the insertion of a single character only has been described it is obvious that the operator need only continue depressing alphanumeric characters on the keyboard 16 to cause further successive insertions. Stated otherwise, the insert mode continues until the operator reverts to another mode of operation.

Figure 6:
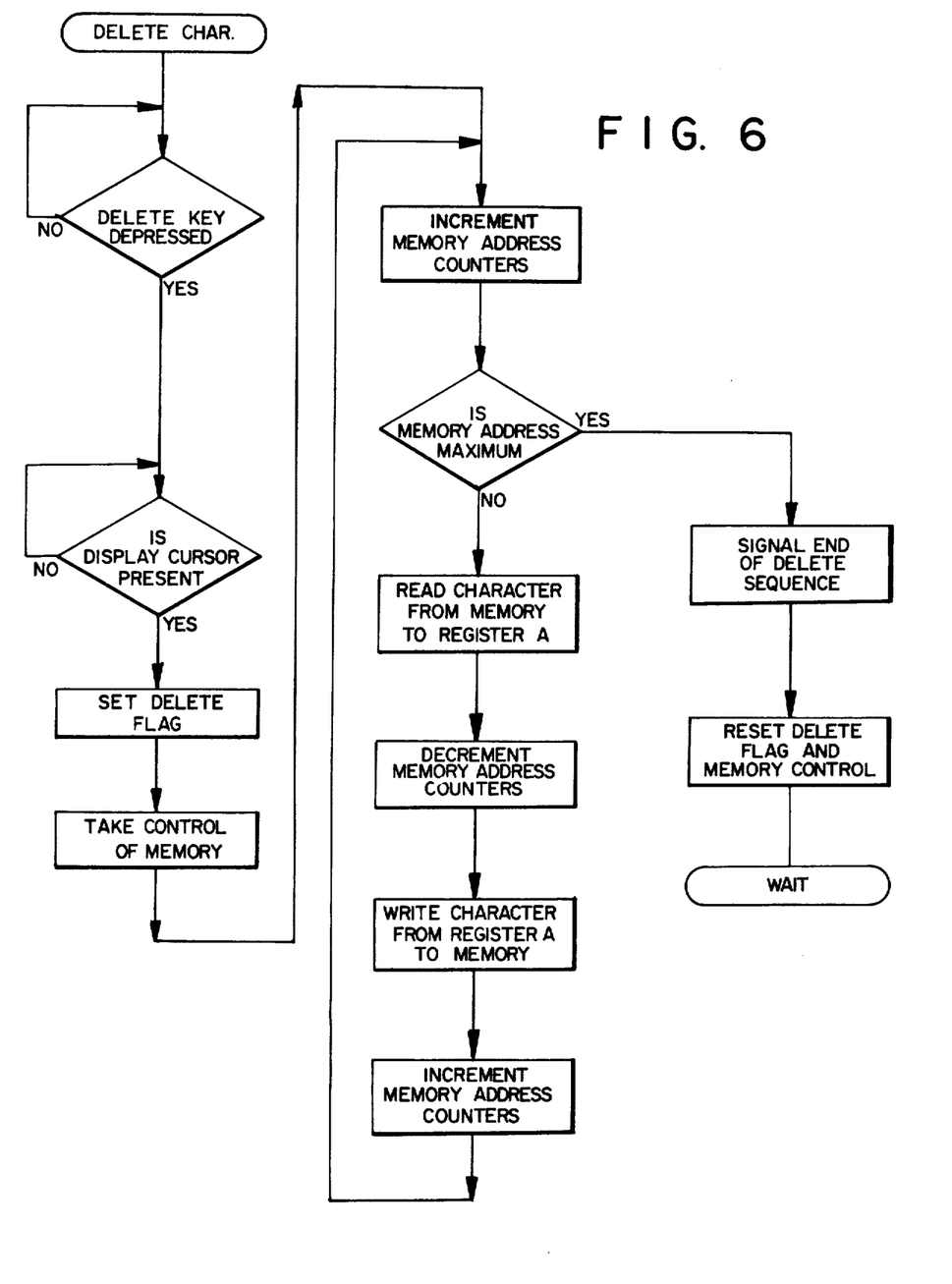
FIG. 6 is a flow diagram of the delete character sequence.

The delete sequence logic as illustrated in the flow diagram of FIG. 6 operates to cause the removal of a character from the memory and shift all succeeding data to the next lower address location so as to fill the void created by the deleted character. The delete sequence logic is activated by depressing a delete control key on the keyboard which sets flip-flop 7 as shown in FIG. 3. Flip-flop 8 sets upon the next occurrence of the load cursor signal which generates the delete flag. The delete flag sets enabling flip-flop 9 which takes control over memory with the next occurrence of the vertical sync signal. A sub-routine then follows, which deletes the character and reorganizes memory moving all data to the next lower address position. The delete sequence logic operates to increment the memory address by one, read the contents of the memory at that position into register A, decrement the memory address, and write the contents of register A into memory. This will be followed by two increment address commands, the contents of the memory being again read into register A, followed by a decrement command and writing the contents of register A into memory. This sequence will continue in this fashion until the maximum memory address is reached (i.e., memory maximum), at which point the delete sequence logic will release control of the memory to the display system 18.

The delete sequence repeat logic is initiated by the setting of the delete flag which enables binary counter 19 and decoder 23 through NAND gates 90, 91 and inverter 92. The memory address counters 40 are incremented by decoding state (1) of binary counter 19 with decoder 23 through Nand gate 72 and inverter 87 on line 84 and through Or gate 62. Next, state (2) of binary counter 19 is used to check for a maximum memory count by decoder 23 through gates 71 and 85. If a maximum memory count is found the delete sequence is ended. If not, states (3) and (4) of binary counter 19 is used by decoder 23 through gates 73, 74, 77, 78, 81 and 82 to cause register A to become loaded with the contents of the random access memory 42 at the incremented memory address location. State (5) of binary counter 19 is then decoded by decoder 23 which through line 89 causes the memory address counters 40 to be decremented by one address location through Or gate 60. States (6) and (7) of the binary counter 19 are used by decoder 23 and gates 75, 76, 79 and 80 to form a write memory signal which transfers the data from register A through the multiplexer 44 to memory 42 at the decremented address. State (8) of binary counter 19 is used to increment the memory address counter through Nand gate 72 and inverter 87 on line 84 which reestablishes the sequence until a maximum memory count is reached which forms the exit signal resetting flip-flops 7 and 8 and disabling flip-flop 9.

Figure 7:
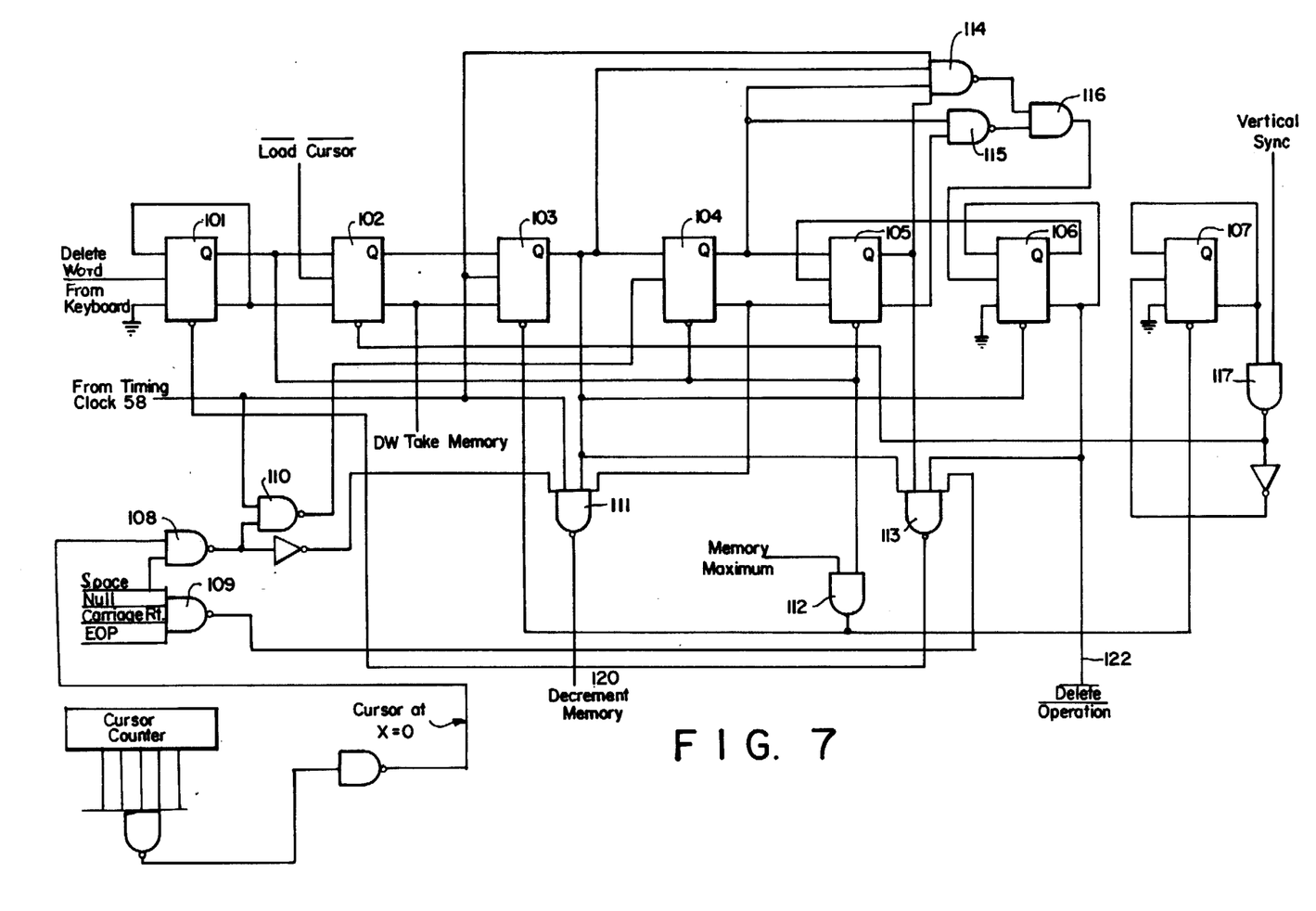
FIG. 7 illustrates schematically the delete word section of the editing logic.
Figure 8:
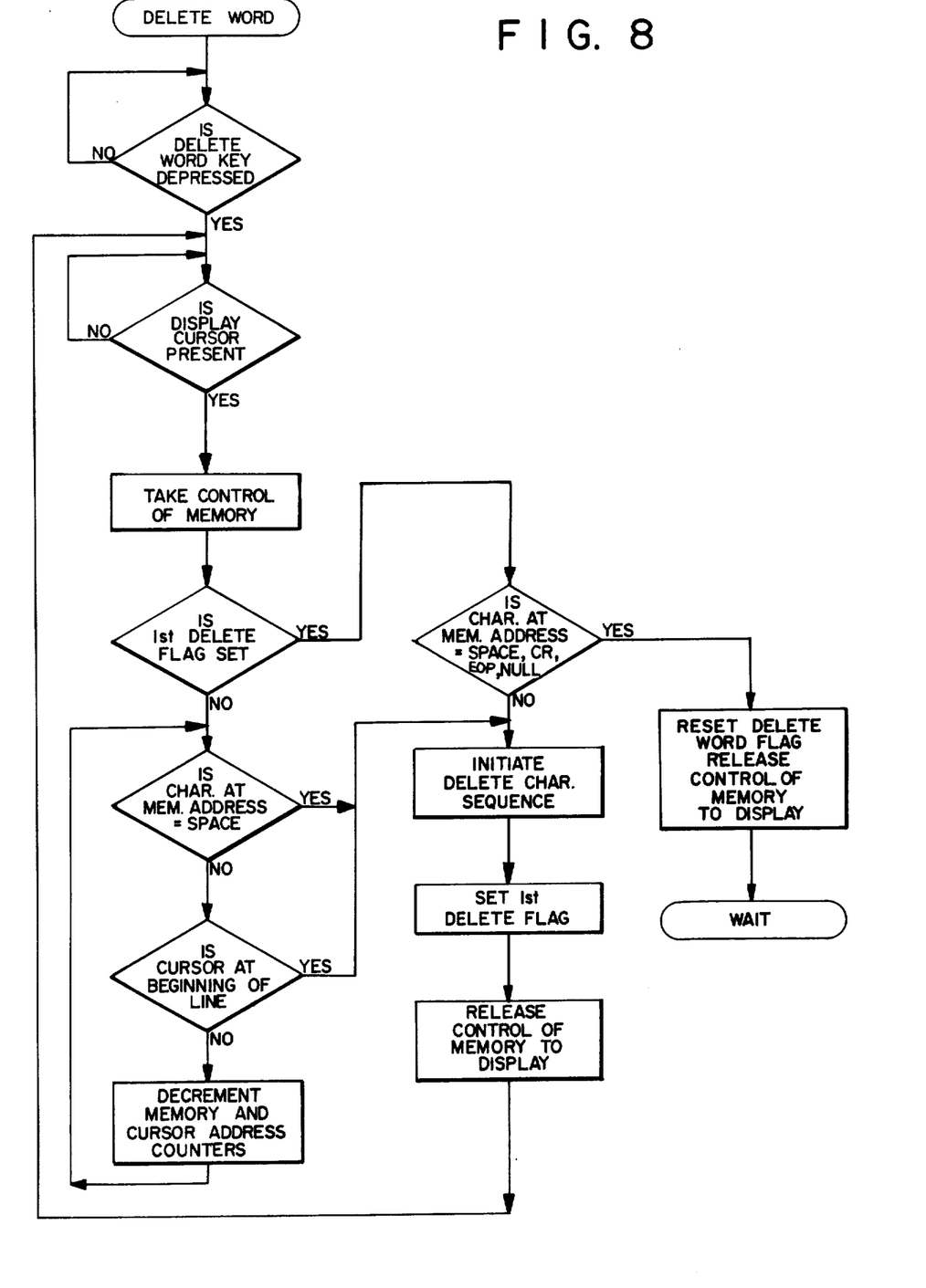
FIG. 8 is a flow diagram of the delete word sequence.

FIGS. 7 and 8 illustrate the circuitry for the delete word logic section and the delete word logic flow sequence respectively. A word for this case is defined by a character or group of characters bound on each side by one of the following: the beginning of a line, a space, a null location, a carriage return, and an end of paragraph. The delete word logic uses the delete character logic to remove a word from memory. The delete word sequence logic system 56 is activated by depressing a control key on the keyboard 16. At the occurrence of the next load cursor pulse, the delete word sequence logic will take control of the memory. The logic will then interrogate the memory contents at that address to determine whether this is a word beginning code or not. If it is not a word beginning code, it will decrement the memory address characters until such times as a word beginning code is reached. At that point, the word sequence logic will then activate the delete character logic thus removing the character at that address from memory. On completion of each delete character sequence the delete word sequence logic will interrogate the code at that address to determine if this is a word ending code. If it is not the logic will again cause a delete character sequence to occur, and continue in this manner until such time as a word ending is reached.

A word beginning condition occurs either on a space or at the first position of a row of characters. To determine if the word is at the first position on a row the cursor x address is decremented at the same time as the memory address counters are decremented. Should the x address cursor counters reach the condition where x equals zero, i.e., the first position on the row of characters, then the delete word sequence logic will accept that condition as the beginning of a word. A word ending condition occurs either on a space, a carriage return, an end of paragraph code, or a null condition, i.e., a position which contains no valid code. Occurrence of such a word ending code will terminate the delete word sequence.

Flip-flops 101, 102, and 103 of FIG. 7 are timed into the system to look for the delete word key to be depressed, the load cursor signal, and to take control of memory. The memory address counters 40 are then decremented by clock signals through gate 111 on line 120 until either one of the following two conditions is detected by the memory decoder 48: The beginning of a line i.e., cursor counters at x equals zero or a space. Should the memory decoder 48 detect either condition then gates 108 and 110 will cause flip-flop 104 to set. When flip-flop 104 is set, gate 111 is inhibited from further decrementing of the address counters 40 and provides a pulse through gates 115 and 116 for setting flip-flop 106. With flip-flop 106 set a delete operation signal is formed on line 122 which causes a delete character sequence to begin as indicated heretofore in connection with FIGS. 3 and 4. Initiation of the delete character sequence begins here by causing the delete flag to be set with the setting of flip-flop 7 which sets flip-flop 8 upon receipt of the next load cursor pulse as explained earlier. When a maximum memory count is reached by the delete character sequence logic 50 flip-flop 103 is reset through gate 112. This then permits flip-flop 107 to set with the next occurrence of the vertical sync signal through gate 117 which in turn resets flip-flop 102. Upon resetting flip-flop 102, flip-flop 103 resets which causes flip-flop 106 to reset which in turn causes flip-flop 105 to set. The setting of flip-flop 5 identifies on FIG. 8 the setting of the first delete flag. This ends the sequence that deletes the first character of the word which is to be deleted. The delete word logic continues to repeat its sequence of deleting characters until a space, null, carriage return or end of paragraph is detected by gate 109 signifying the end of the word to be deleted by causing gate 113 to reset flip-flop 1 which causes the sequence to end.

Figure 9:
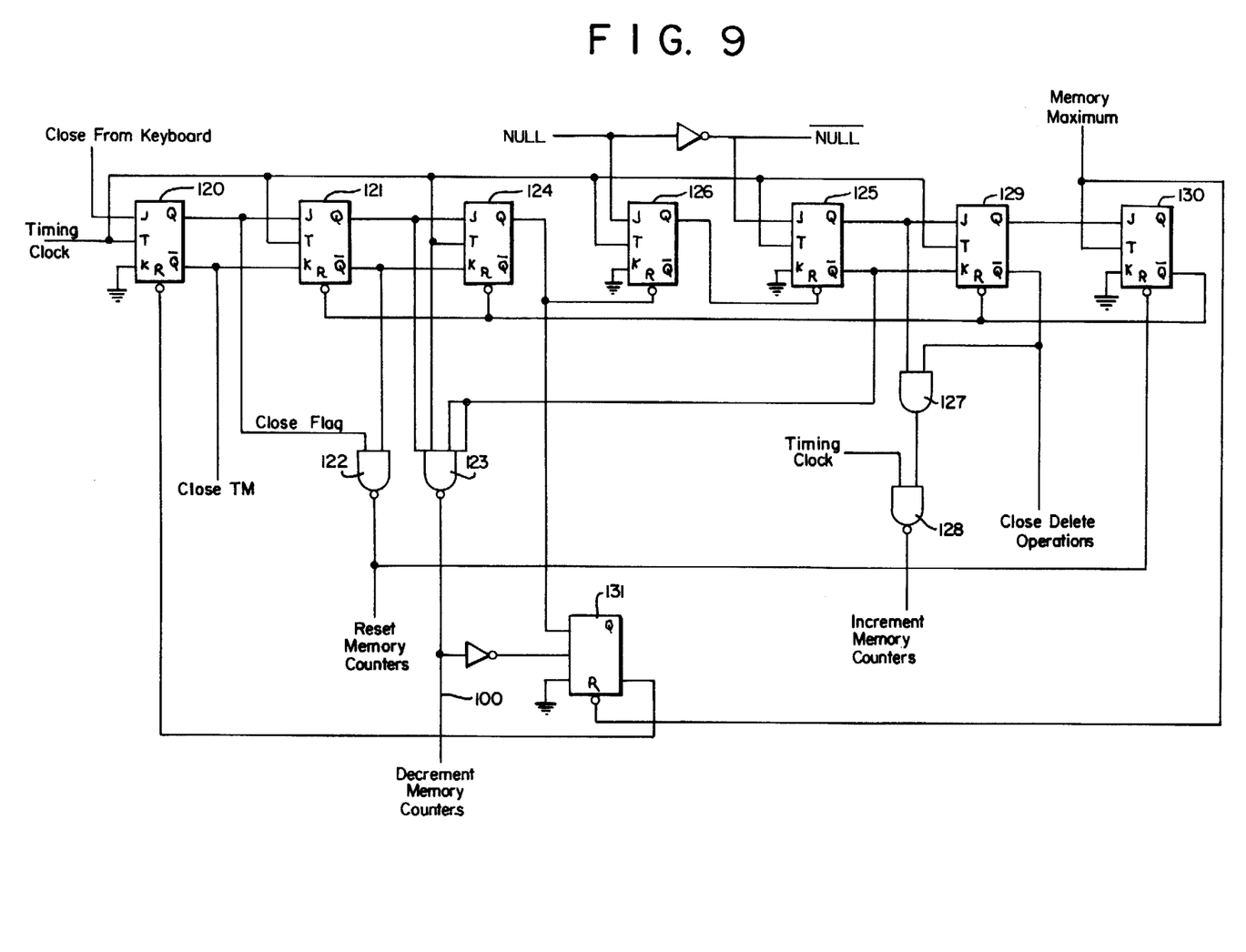
FIG. 9 illustrates schematically the close section of the editing logic.
Figure 10:
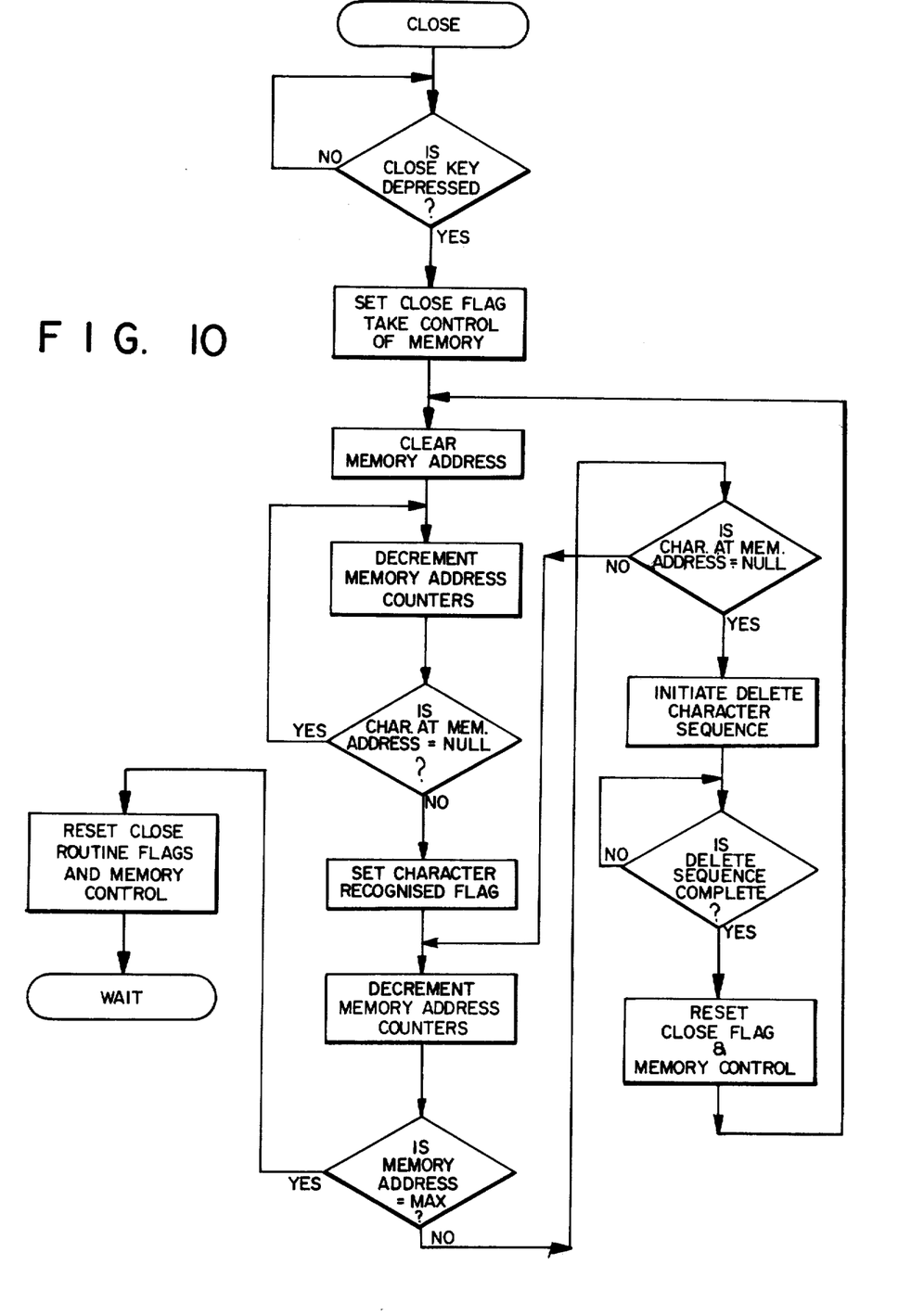
FIG. 10 is a flow diagram of the close sequence.

The close operation is schematically shown in FIG. 9 with FIG. 10 illustrating the close flow sequence. The close operation causes the data in memory to be contiguous, i.e., no nulls (voids) in the data stream. The close sequence logic when activated will take control of the memory, clear the memory address, decrement the memory address by one further count (i.e., to the end of memory,) and interrogate the memory contents to determine if a valid character exists at that address or not. If no valid character exists, (i.e., a null exists), the memory address will be decremented until such times as a valid character does exist. Thereafter at the occurrence of a valid character the close sequence logic will decrement the memory address and test for a null condition. If a null condition is detected, the close sequence logic will initiate the delete sequence at that point. The delete sequence logic will perform a delete routine and terminate at the memory maximum address. At that point the close sequence logic will repeat its operation, i.e., by beginning at the end of memory and interrogating for the first valid character, then seeking a null condition and initiating a delete routine. This process will continue until such times as the close sequence logic reaches the first position in memory, at which point the operation will be terminated. Flip-flop 120 detects the depression of the close key and causes the memory address counters 40 to be reset to zero. The next clock cycle sets flip-flop 121 removing the reset from the memory address counters 40 through gate 122 enabling gate 123 to cause on line 100 a memory address counter decrement pulse on each successive clock cycle. On the next clock cycle flip-flop 124 sets enabling flip-flop 126 which will set upon the occurrence of a valid character. A decrement pulse continues on each clock cycle to go through gate 123 until flip-flop 126 detects the presence of a valid character coming from memory. When a valid character is found flip-flop 126 sets enabling flip-flop 125 by releasing reset. When flip-flop 125 finds the next null character it sets causing the memory address counters to be incremented by the signal through gates 127 and 128 and enabling flip-flop 129 to be set on the next clock cycle. When flip-flop 129 sets the delete character operation of FIG. 3 starts deleting the null character found by flip-flop 125. When the delete character operation is finished it causes a memory maximum to occur setting flip-flop 130 which in turn resets all flip-flops except 120. The close sequence starts at the beginning again. This repeats until all of the null characters are deleted from the data stream. Flip-flop 131 detects the fact that there have been no nulls deleted by the close sequence for a full cycle of the memory address counters by looking for a memory maximum to occur during a decrement signal. Flip-flop 131 sets causing flip-flop 120 to reset which ends the close operation.

Figure 11:
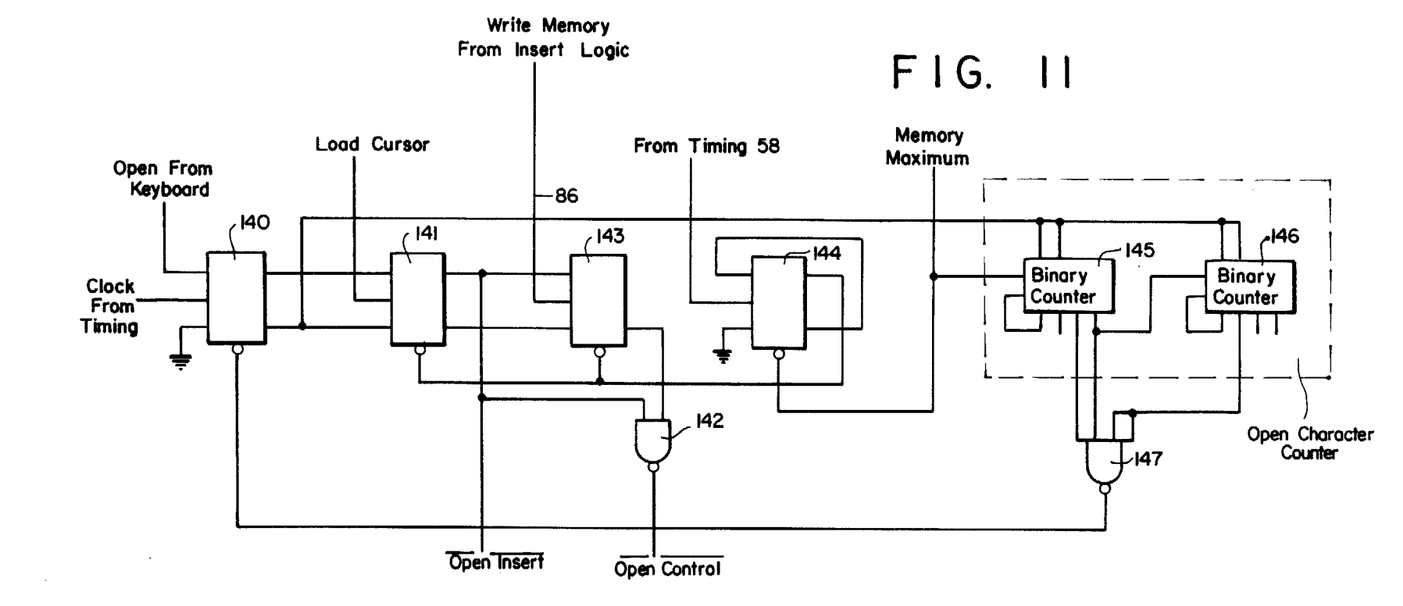
FIG. 11 illustrates schematically the open section of the editing logic.
Figure 11A:
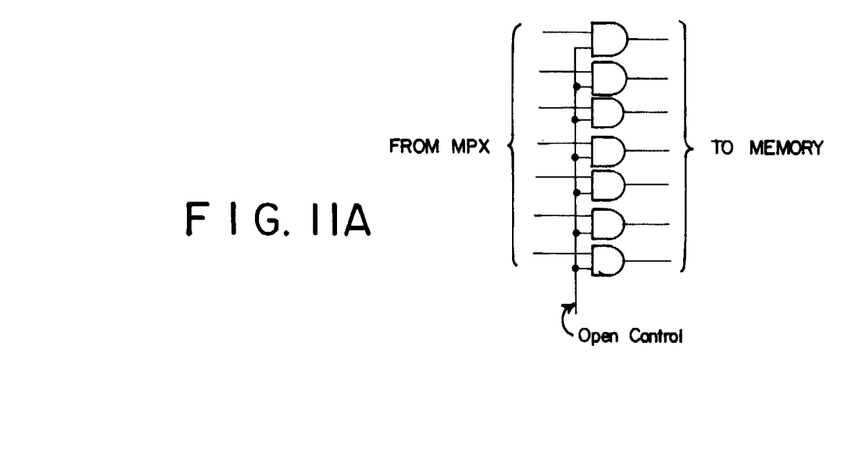
FIG. 11a is a more detailed circuit of the control disable block shown in FIG. 2.
Figure 12:
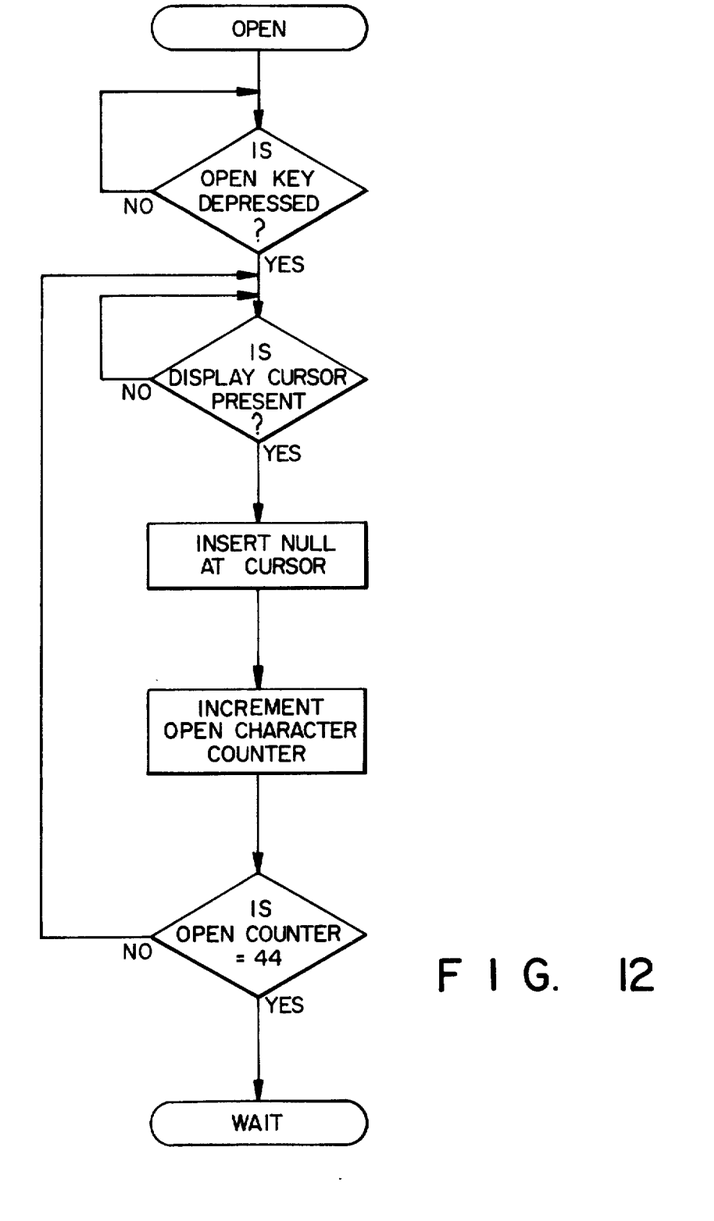
FIG. 12 is a flow diagram of the open sequence.

FIG. 11 illustrates the open section of the editing logic while FIG. 12 presents the flow diagram of the open sequence. The open sequence causes 44 nulls representing a line of blank characters to be inserted in the data stream beginning at the cursor position. Flip-flop 140 detects the open key being depressed, enabling binary counter chain 145 and 146 and flip-flop 141. Flip-flop 141 sets with the occurrence of the load cursor signal to cause an insert character operation to occur and at the same time presenting a null to memory 42 by a signal from gate 142 to the input of the control disable 149 which is shown in greater detail in FIG. 11a. When the insert logic causes the null to be written into memory it also sets flip-flop 143 which disables gate 142 removing the signal which caused the null to go to memory. The insert operation upon completion causes the memory maximum signal to occur resetting normally set flip-flop 144 which resets flip-flops 141 and 143. The memory maximum signal also increments binary counter chain 145 and 146. This operation repeats until 44 memory maximum signals occur causing the binary counter chain 145 and 146 to present true signals to gate 147 which resets flip-flop 140 and terminates the open operation.

What is claimed is:

1. Apparatus for editing the character contents of a random access data storage memory having a predetermined number of character locations from an alphanumeric and control keyboard, said random access data storage memory operating in conjunction with CRT display means for visually displaying data characters stored in said memory, and memory address counter means for identifying each character location within said memory, comprising:

means for selecting a character from said displayed data upon which to perform an editing operation;

clock means for incrementing said memory address counter means;

means for signaling coincidence between said selected character and a predetermined character location within said memory as defined by said memory address counter means;

means responsive to an insert command signal from said keyboard for generating an insert flag signal;

a first storage register;

means responsive to said insert flag signal for transferring the character contents at said predetermined character location in memory to said first storage register;

keyboard write control means for inserting a character presented from said keyboard into said predetermined character location in said memory;

a second storage register;

logic means responsive to said insert flag signal for reorganizing the character contents within said memory following said predetermined character location, said logic means comprising; first signal means for incrementing said memory address counter means one character location, second signal means for transferring the contents of said first storage register into said second storage register, third signal means for transferring the character contents in said memory at the incremented character location identified by said memory address counter means into said first storage register; fourth signal means for transferring the character contents from said second storage register to said incremented character location in said memory and means for repeatedly recycling said first, second, third and fourth signal means respectively; and memory maximum signal means for disabling said logic means when said memory address counter means reaches a predetermined maximum character location in memory.

2. Apparatus as defined in claim 1 wherein said logic means comprises; binary counter means, memory decoder means for detecting the states of said binary counter means, and gating means responsive to predetermined decoded states of said binary counter means for generating said first, second, third and fourth signal means respectively.

3. Apparatus as defined in claim 2 wherein said means for selecting a character from said displayed data comprises a display cursor and cursor control means for adjusting the position of said display cursor to any data location upon said CRT display means.

4. Apparatus as defined in claim 3 further comprising; means responsive to an open command signal from said keyboard for generating an open sequence logic signal, first means responsive to said open sequence logic signal for transferring the character contents in said memory at a location corresponding to the location of said display cursor into said first storage register, second means responsive to said open sequence logic signal for inserting a predetermined character representing a null in said memory at said display cursor location, third means responsive to said open sequence logic signal for enabling said logic means; first increment signal means responsive to said memory maximum signal means for incrementing said display cursor by one character location; second increment signal means responsive to said memory maximum signal means for incrementing said memory address counter means until coincident with said display cursor location, means responsive to said second increment signal means for regenerating said open sequence logic signal; and counter means responsive to each activation of said memory maximum signal means for disabling said regenerating means upon reaching a predetermined count.

5. Apparatus for editing the character contents of a random access data storage memory having a predetermined number of character locations from an alphanumeric and control keyboard, said random access data storage memory operating in conjunction with CRT display means for visually displaying data characters stored in said memory, and memory address counter means for identifying each character location within said memory comprising:

means for selecting a character from said displayed data upon which to perform an editing operation;

clock means for incrementing said memory address counter means;

means for signaling coincidence between said selected character and a predetermined character location within said memory as identified by said memory address counter means;

means responsive to a command signal from said keyboard for generating a character delete signal;

a character storage register;

delete logic means responsive to said character delete signal for deleting said selected character by reorganizing the character contents within said memory, said logic means comprising; first signal means for incrementing said memory address counter means one character location from said predetermined location, said incremented location representing a first character location, second signal means for transferring the character contents at said first character location within said memory to said character storage register, third signal means for decrementing said address counter means one character location, fourth signal means for transferring the contents of said character storage register to said decremented location within said memory, fifth signal means for incrementing said address counter two character locations from said decremented location and representing a second character location, sixth signal means for transferring the character contents at said second character location in said memory to said character storage register, means for repeatedly recycling said third, fourth, fifth and sixth signal means respectively; and memory maximum signal means for disabling said delete logic means when said memory address counter means reaches a predetermined maximum character location in said memory.

6. Apparatus as defined in claim 5 wherein said delete logic means comprises; binary counter means, memory decoder means for detecting the states of said binary counter means, and gating means responsive to predetermined decoded states of said binary counter means for generating said first, second, third, fourth, fifth and sixth signal means respectively.

7. Apparatus as defined in claim 6 further comprising:
means responsive to another predetermined command signal from said keyboard for generating a multiple character delete signal;
first means responsive to said multiple character delete signal for interrogating the character contents of said memory at said predetermined character location;
means for decrementing said memory address counter means until a first predetermined alphanumeric character is identified by said first means;
means for generating said character delete signal upon recognition of said first predetermined alphanumeric character;
second means for interrogating the character contents of said memory at said decremented character location; and
means for regenerating said character delete signal until said second means identifies a second predetermined alphanumeric character.

8. Apparatus as defined in claim 7 wherein said first predetermined alphanumeric character defines the ending of a word and wherein said second predetermined alphanumeric character defines the beginning of such word.

9. Apparatus as defined in claim 6 further comprising:
means responsive to a close command signal from said keyboard for generating a close character signal;
means responsive to said close character signal for setting said memory address counter means to a first predetermined character location in memory.
first means for decrementing said memory address means one character location;
second means for interrogating the character contents at said decremented location in said memory;
third means for generating said character delete signal upon recognition of a predetermined character;
fourth means for detecting a second predetermined character location in memory; and
means for recycling said first, second, third, fourth and fifth means respectively until said second predetermined character location in memory is detected.

* * * * *